United States Patent
Lee et al.

(10) Patent No.: US 11,012,944 B2
(45) Date of Patent: May 18, 2021

(54) METHOD FOR TRANSMITTING UPLINK SIGNAL IN WIRELESS COMMUNICATION SYSTEM AND DEVICE THEREFOR

(71) Applicant: LG Electronics Inc., Seoul (KR)

(72) Inventors: Hyunho Lee, Seoul (KR); Yunjung Yi, Seoul (KR); Daesung Hwang, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/610,788

(22) PCT Filed: May 4, 2018

(86) PCT No.: PCT/KR2018/005229
§ 371 (c)(1),
(2) Date: Nov. 4, 2019

(87) PCT Pub. No.: WO2018/203732
PCT Pub. Date: Nov. 8, 2018

(65) Prior Publication Data
US 2020/0169958 A1    May 28, 2020

Related U.S. Application Data

(60) Provisional application No. 62/575,284, filed on Oct. 20, 2017, provisional application No. 62/565,084, (Continued)

(51) Int. Cl.
*H04W 52/14* (2009.01)
*H04W 52/36* (2009.01)
*H04W 72/12* (2009.01)

(52) U.S. Cl.
CPC ....... *H04W 52/146* (2013.01); *H04W 52/367* (2013.01); *H04W 72/1284* (2013.01)

(58) Field of Classification Search
CPC ............ H04W 52/146; H04W 52/367; H04W 72/1284; H04W 52/14; H04W 52/30
See application file for complete search history.

(56) References Cited

U.S. PATENT DOCUMENTS 10,219,225 B2 * 2/2019 Kim ................ H04W 88/06
2006/0003787 A1   1/2006 Heo et al.
(Continued)

FOREIGN PATENT DOCUMENTS

CN    102301801    12/2011
CN    105247932    1/2016
(Continued)

OTHER PUBLICATIONS

Chinese Office Action in Chinese Application No. 201880042811.4, dated Jun. 2, 2020, 11 pages (with English translation).
(Continued)

*Primary Examiner* — Hassan Kizou
*Assistant Examiner* — Abdullahi Ahmed
(74) *Attorney, Agent, or Firm* — Fish & Richardson P.C.

(57) ABSTRACT

A method by which a terminal transmits an uplink signal in a wireless communication system, according to one embodiment of the present invention, comprises the steps of: determining whether transmission power of a plurality of uplink channels, which are simultaneously transmitted in a plurality of serving cells and has transmission time intervals (TTIs) of different lengths, exceeds maximum power of a terminal; and transmitting an uplink channel excluding an uplink channel, which is determined according to a preset priority rule, among the plurality of uplink channels when the transmission power of the plurality of uplink channels exceeds the maximum power of the terminal.

10 Claims, 7 Drawing Sheets

Related U.S. Application Data filed on Sep. 28, 2017, provisional application No. 62/535,946, filed on Jul. 23, 2017, provisional application No. 62/507,156, filed on May 16, 2017, provisional application No. 62/503,920, filed on May 9, 2017, provisional application No. 62/501,727, filed on May 4, 2017.

(56) References Cited

U.S. PATENT DOCUMENTS

| | | | |
|---|---|---|---|
| 2014/0050205 A1* | 2/2014 | Ahn | H04B 17/318 370/336 |
| 2014/0119302 A1* | 5/2014 | Ahn | H04W 72/0446 370/329 |
| 2015/0055454 A1 | 2/2015 | Yang et al. | |
| 2015/0208402 A1 | 7/2015 | Hwang et al. | |
| 2016/0234788 A1* | 8/2016 | Noh | H04W 52/146 |
| 2017/0238268 A1* | 8/2017 | Yang | H04W 72/0413 370/329 |
| 2018/0279227 A1* | 9/2018 | Kim | H04W 52/38 |
| 2018/0279283 A1* | 9/2018 | Takeda | H04W 72/044 |
| 2018/0309552 A1* | 10/2018 | Akkarakaran | H04L 5/0048 |

FOREIGN PATENT DOCUMENTS

| | | |
|---|---|---|
| CN | 107925969 | 4/2018 |
| KR | 100933144 | 12/2009 |
| KR | 20150105352 | 9/2015 |
| KR | 20160013938 | 2/2016 |
| KR | 20160022914 | 3/2016 |
| KR | 20160111886 | 9/2016 |
| KR | 20170028792 | 3/2017 |
| WO | WO2013048172 | 4/2013 |
| WO | WO2015139460 | 9/2015 |
| WO | WO2016137816 | 9/2016 |
| WO | WO2017051716 | 3/2017 |

OTHER PUBLICATIONS

Ericsson, "Aspects related to the dynamic switching between 1ms TTI and sTTI," R1-1717160, 3GPP TSG-RAN WG1 Meeting #90bis, Prague, Czech Republic, dated Oct. 9-13, 2017, 10 pages.
Japanese Office Action in Japanese Application No. 2019-560681, dated Apr. 7, 2020, 6 pages (with English translation).
LG Electronics, "Summary of email approval [90b-LTE-12] on sPUSCH/sPUCCH power control and UL collision handling between different TTI lengths," R1-1719856, 3GPP TSG RAN WG1 Meeting #91, Reno, US, dated Nov. 27-Dec. 1, 2017, 22 pages.
LG Electronics, "Remaining issues on collision handling between different TTI lengths," R1-1719855, 3GPP TSG RAN WG1 Meeting #91, Reno, US, dated Nov. 27-Dec. 1, 2017, 9 pages.
Ericsson, R1-1703271, "sPUSCH power control and PHR report for sTTI," 3GPP TSG RAN WG1 #88, 3GPP server publication date (Feb. 6, 2017).
NTT Docomo et al., R1-1610048, "sPUSCH for shortened TTI," 3GPP TSG RAN WG1 #86bis, 3GPP server publication date (Oct. 1, 2016).
Huawei et al., R1-1701738, "UL power control for short TTI," 3GPP TSG RAN WG1 #88, 3GPP server publication date (Feb. 7, 2017).
NTT Docomo et al., R1-1702786, "Views on UCI on sPUSCH," 3GPP TSG RAN WG1 #88, 3GPP server publication date (Feb. 7, 2017).
Ericsson, "sPUSCH power control and PHR report for sTTI," R1-1703271, 3GPP TSG-RAN WG1 Meeting #88, Athens, Greece, dated Feb. 13-17, 2017, 4 pages.
Huawei, HiSilicon, "UL power control for short TTI," R1-1701738, 3GPP TSG RAN WG1 Meeting #88, Athens, Greece, dated Feb. 13-17, 2017, 4 pages.
NTT Docomo, Inc., "sPUSCH for shortened TTI," R1-1610048, 3GPP TSG RAN WG1 Meeting #86bis, Lisbon, Portugal, dated Oct. 10-14, 2016, 8 pages.
NTT Docomo, Inc., "Views on UCI on sPUSCH," R1-1702786, 3GPP TSG RAN WG1 Meeting #88, Athens, Greece, dated Feb. 13-17, 2017, 5 pages.
PCT International Search Report and Written Opinion in International Application No. PCT/KR2018/005229, dated Aug. 16, 2018, 21 pages (with English translation).
CATT, "NR Power Headroom Calculation," R1-1707532, 3GPP TSG RAN WG1 Meeting #89, Hangzhou, China, dated May 15-19, 2017, 3 pages.
Extended European Search Report in European Application No. 18794249.5, dated Nov. 19, 2020, 8 pages.
Huawei, HiSilicon, "Discussion on CA issues for shortened TTI operation," R1-1704300, 3GPP TSG RAN WG1 Meeting #88bis, Spokane, USA, dated Apr. 3-7, 2017, 4 pages.
LG Electronics, "UL Collision handling between 1ms TTI and sTTI," R1-1707541, 3GPP TSG RAN WG1 Meeting #89, Hangzhou, China, dated May 15-19, 2017, 6 pages.

* cited by examiner (a) 2 symbol TTI DL structure (b) 3 symbol TTI DL structure (c) 4 symbol TTI DL structure (d) 7 symbol TTI DL structure (a) <3,2,2,2,2,3> sTTI pattern (b) <2,3,2,2,2,3> sTTI pattern

METHOD FOR TRANSMITTING UPLINK SIGNAL IN WIRELESS COMMUNICATION SYSTEM AND DEVICE THEREFOR

CROSS-REFERENCE TO RELATED APPLICATIONS

This application is a National Stage application under 35 U.S.C. § 371 of International Application No. PCT/KR2018/005229, filed on May 4, 2018, which claims the benefit of U.S. Provisional Application No. 62/575,284, filed on Oct. 20, 2017, U.S. Provisional Application No. 62/565,084, filed on Sep. 28, 2017, U.S. Provisional Application No. 62/535,946, filed on Jul. 23, 2017, U.S. Provisional Application No. 62/507,156, filed on May 16, 2017, U.S. Provisional Application No. 62/503,920, filed on May 9, 2017, and U.S. Provisional Application No. 62/501,727, filed on May 4, 2017. The disclosures of the prior applications are incorporated by reference in their entirety.

TECHNICAL FIELD

The present disclosure relates to a wireless communication system and, more particularly, to a method of transmitting an uplink signal supporting a plurality of transmission time intervals, a plurality of processing times, or a plurality of numerologies, and an apparatus therefor.

BACKGROUND ART

The latency of packet data is one of important performance metrics. To reduce the latency of packet data and provide faster Internet access to end users is one of challenging issues in designing the next-generation mobile communication system called new radio access technology (new RAT) as well as long term evolution (LTE).

The present disclosure is intended to deal with contents related to techniques for transmitting or receiving uplink signals in a wireless communication system supporting latency reduction.

DISCLOSURE

Technical Problem

The present disclosure is to provide an uplink signal transmission operation of a user equipment having a plurality of transmission time intervals, a plurality of processing times, or a plurality of numerologies in a carrier aggregation system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an example of the present disclosure, provided herein is a method of transmitting an uplink signal in a wireless communication system, the method being performed by a user equipment (UE). The method may include determining whether transmission power of a plurality of uplink channels of different transmission time interval (TTI) lengths, to be simultaneously transmitted on a plurality of serving cells, exceeds maximum power of the UE, and transmitting an uplink channel, excluding an uplink channel determined according to a preset priority rule among the plural uplink channels, when the transmission power of the plural uplink channels exceeds the maximum power of the UE.

Additionally or alternatively, channels may be dropped starting from an uplink channel of a low priority in order, among the plural uplink channels, until the transmission power of the plural uplink channels does not exceed the maximum power of the UE.

Additionally or alternatively, the preset priority rule may be defined in consideration of a TTI length, a channel type, whether uplink control information is included, and whether a demodulation reference signal (DMRS) is included.

Additionally or alternatively, the preset priority rule may be defined in further consideration of a cell index.

Additionally or alternatively, the preset priority rule may be defined in further consideration of a cell group or a physical uplink control channel (PUCCH) group.

Additionally or alternatively, uplink control information of the excluded uplink channel determined according to the preset priority rule may be transmitted on an uplink channel of a highest priority in a cell group or physical uplink control channel (PUCCH) group to which the excluded uplink channel belongs.

Additionally or alternatively, the preset priority rule may be defined in consideration of a TTI length, a channel type, whether uplink control information is included, whether a demodulation reference signal (DMRS) is included, and a cell index.

According to another example of the preset disclosure, provided herein is a user equipment (UE) for transmitting an uplink signal in a wireless communication system. The UE may include a receiver and a transmitter; and a processor configured to control the receiver and the transmitter. The processor may determine whether transmission power of a plurality of uplink channels of different transmission time interval (TTI) lengths, to be simultaneously transmitted on a plurality of serving cells, exceeds maximum power of the UE, and transmit an uplink channel, excluding an uplink channel determined according to a preset priority rule among the plural uplink channels, when the transmission power of the plural uplink channels exceeds the maximum power of the UE.

Additionally or alternatively, channels may be dropped starting from an uplink channel of a low priority in order, among the plural uplink channels, until the transmission power of the plural uplink channels does not exceed the maximum power of the UE.

Additionally or alternatively, the preset priority rule may be defined in consideration of a TTI length, a channel type, whether uplink control information is included, and whether a demodulation reference signal (DMRS) is included.

Additionally or alternatively, the preset priority rule may be defined in further consideration of a cell index.

Additionally or alternatively, the present priority rule may be defined in further consideration of a cell group or a physical uplink control channel (PUCCH) group.

Additionally or alternatively, uplink control information of the excluded uplink channel determined according to the preset priority rule may be transmitted on an uplink channel of a highest priority in a cell group or physical uplink control channel (PUCCH) group to which the excluded uplink channel belongs.

Additionally or alternatively, the preset priority rule may be defined in consideration of a TTI length, a channel type, whether uplink control information is included, whether a demodulation reference signal (DMRS) is included, and a cell index.

The above technical solutions are merely some parts of the examples of the present disclosure and various examples into which the technical features of the present disclosure are incorporated may be derived and understood by persons skilled in the art from the following detailed description of the present disclosure.

Advantageous Effects

According to examples of the present disclosure, uplink transmission can be efficiently performed.

It will be appreciated by persons skilled in the art that the effects that may be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure, illustrate examples of the disclosure and together with the description serve to explain the principle of the disclosure.

BEST MODE FOR CARRYING OUT THE INVENTION

Figure 1:
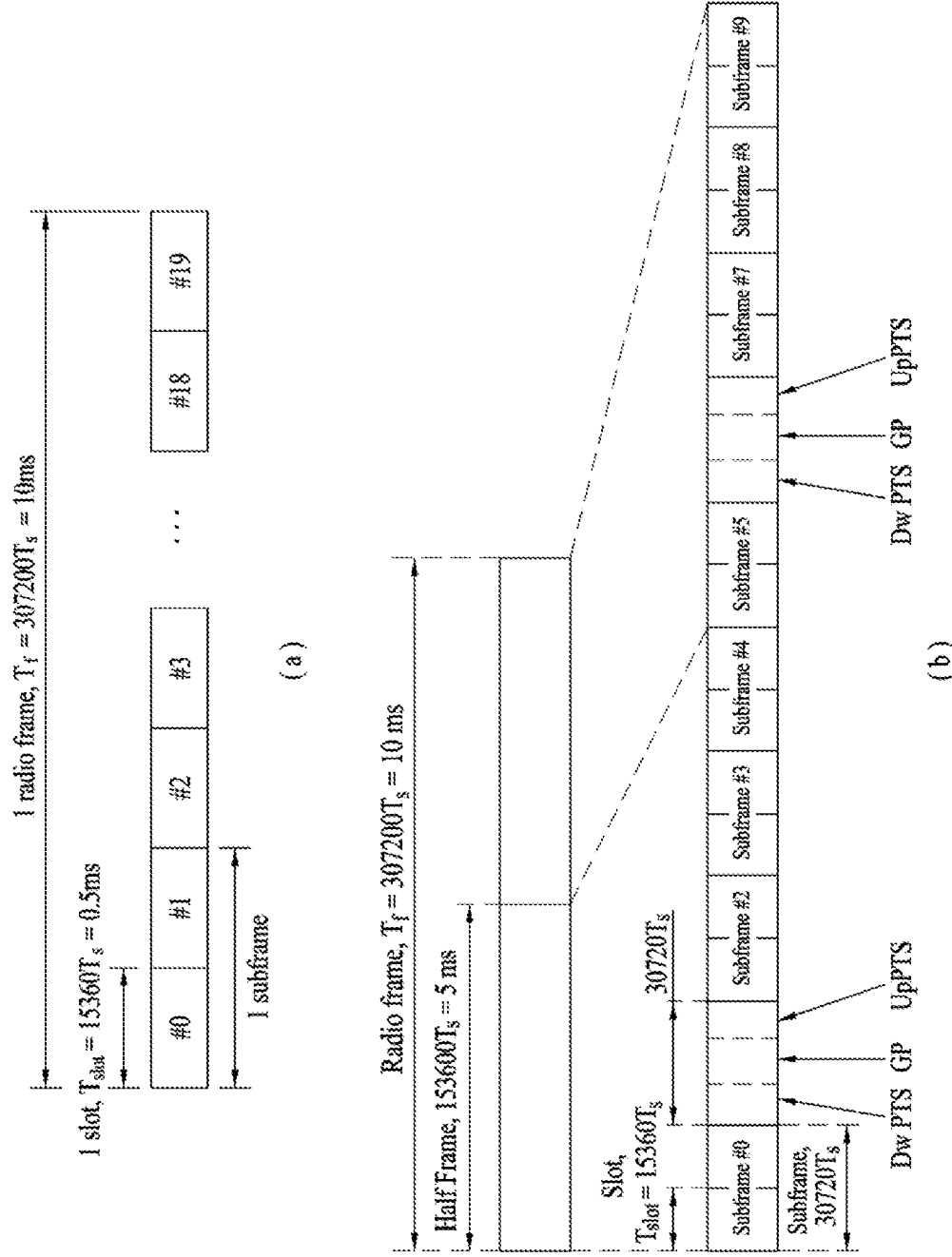
FIG. 1 illustrates the structure of a radio frame used in a wireless communication system.

Reference will now be made in detail to the exemplary examples of the present disclosure, examples of which are illustrated in the accompanying drawings. The detailed description, which will be given below with reference to the accompanying drawings, is intended to explain exemplary examples of the present disclosure, rather than to show the only examples that may be implemented according to the disclosure. The following detailed description includes specific details in order to provide a thorough understanding of the present disclosure. However, it will be apparent to those skilled in the art that the present disclosure may be practiced without such specific details.

In some instances, known structures and devices are omitted or are shown in block diagram form, focusing on important features of the structures and devices, so as not to obscure the concept of the present disclosure. The same reference numbers will be used throughout this specification to refer to the same or like parts.

In the present disclosure, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present disclosure, a BS will be referred to as an eNB.

In the present disclosure, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB may be smoothly performed in comparison with cooperative communication between eNBs connected by a radio line. At least one antenna is installed per node. The antenna may mean a physical antenna or mean an antenna port or a virtual antenna. A node is also referred to as a point. Compared to a conventional centralized antenna system (CAS) (i.e., a single-node system) in which antennas are concentrated in an eNB and controlled by one eNB controller, a plurality of nodes are generally located apart from each other by a predetermined distance or larger in a multi-node system. The plurality of nodes may be managed by one or more eNBs or eNB controllers which schedule data to be transmitted/received through each node. Each node may be connected to an eNB or eNB controller managing the node by cable or a dedicated line. In the multi-node system, the same or different cell identifies (IDs) may be used for signal transmission/reception to/from the plurality of nodes. If the plurality of nodes has the same cell ID, each of the nodes operates as a set of some antennas in one cell. If the nodes have different cell IDs in the multi-node system, this multi-node system may be regarded as a multi-cell (e.g., macro-cell/pemto-cell/pico-cell) system. If multiple cells formed by the plurality of nodes, respectively are overlaid with each other according to their coverages, a network constructed with the multiple cells is called a multi-tier network. The cell ID of an RRH/RRU and the cell ID of an eNB may be the same or different. If the RRH/RRU and the eNB use different cell IDs, both of the RRH/RRU and the eNB operate as independent BSs.

In a multi-node system of the present disclosure as described below, one or more eNBs or eNB controllers connected to a plurality of nodes may control the nodes to enable all or a part of the nodes to simultaneously transmit or receive signals to and from a LE. Although there are differences between multi-node systems in terms of the entity and implementation of each node, the multi-node systems are also different from a single-node system (e.g., a CAS, a legacy MIMO system, a legacy relay system, a legacy repeater system, or the like) in that a plurality of nodes participate together in providing a communication service to a UE in predetermined time-frequency resources. Accordingly, examples of the present disclosure pertaining to a method of performing data cooperative transmission by means of all or a part of a plurality of nodes are applicable to various types of multi-node systems. For example, while a node generally refers to an antenna group apart from another node by a predetermined distance or larger, the following examples of the present disclosure are also applicable even when a node refers to any antenna group irrespective of the distance between nodes. For example, for an eNB including X-pol (cross-polarized) antennas, the examples of the present disclosure may be applied with the appreciation that the eNB controls a node with H-pol antennas and a node with V-pol antennas.

A communication technique in which signals are transmitted/received through a plurality of transmission (Tx)/ reception (Rx) nodes, signals are transmitted/received through at least one node selected from a plurality of Tx/Rx nodes, or a node transmitting a DL signal is different from a node receiving a UL signal is called multi-eNB MIMO or coordinated multi-point Tx/Rx (CoMP). Among these schemes for cooperative communication between nodes, cooperative transmission schemes are largely classified into joint processing (JP) and scheduling coordination. JP may further be classified into joint transmission (JT)/joint reception (JR) and dynamic point selection (DPS), whereas scheduling coordination may further be classified into coordinated scheduling (CS) and coordinated beamforming (CB). DPS is also referred to as dynamic cell selection (DCS). Compared to the cooperative communication schemes, when JP is performed among cooperative communication schemes between nodes, various communication environments may be formed. Among the JP schemes, a plurality of nodes transmits the same streams to a UE in JT, and a plurality of nodes receive the same stream from a UE in JR. The UE/eNB recovers the stream by combining the received signals. In view of transmission of the same stream from/to a plurality of nodes in JT/JR, the reliability of signal transmission may be increased by transmit diversity. Among the JP schemes, DPS is a communication scheme in which a signal is transmitted/received through a node selected from among a plurality of nodes according to a specific rule. Because a node in a good channel state for a UE is generally selected, DPS may increase the reliability of signal transmission.

In the present disclosure, a cell refers to a prescribed geographical area to which one or more nodes provide a communication service. Accordingly, in the present disclosure, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using channel state information reference signal(s) (CSI-RS(s)) transmitted on a CSI-RS resource, allocated by antenna port(s) of the specific node to the specific node. In general, adjacent nodes transmit CSI-RSs in mutually orthogonal CSI-RS resources. When it is said that CSI-RS resources are orthogonal, the CSI resources are different in terms of at least one of a CSI-RS resource configuration which specifies a symbol and a subcarrier carrying a CSI-RS, a subframe configuration which specifies a subframe to which a CSI-RS is allocated by a subframe offset and a transmission period, or a CSI-RS sequence.

In the present disclosure, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present disclosure, in particular, a time-frequency resource or RE that is assigned to or belongs to PDCCH/PCFICH/ PHICH/PDSCH/PUCCH/PUSCH/PRACH is referred to as PDCCH/PCFICH/PHICH/PDSCH/PUCCH/PUSCH/ PRACH RE or PDCCH/PCFICH/PHICH/PDSCH/PUCCH/ PUSCH/PRACH time-frequency resource, respectively. Therefore, in the present disclosure, PUCCH/PUSCH/ PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

FIG. 1 illustrates the structure of a radio frame used in a wireless communication system. Specifically, FIG. 1(a) illustrates an exemplary structure of a radio frame which may be used in frequency division multiplexing (FDD) in 3GPP LTE/LTE-A and FIG. 1(b) illustrates an exemplary structure of a radio frame which may be used in time division multiplexing (TDD) in 3GPP LTE/LTE-A.

Referring to FIG. 1, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
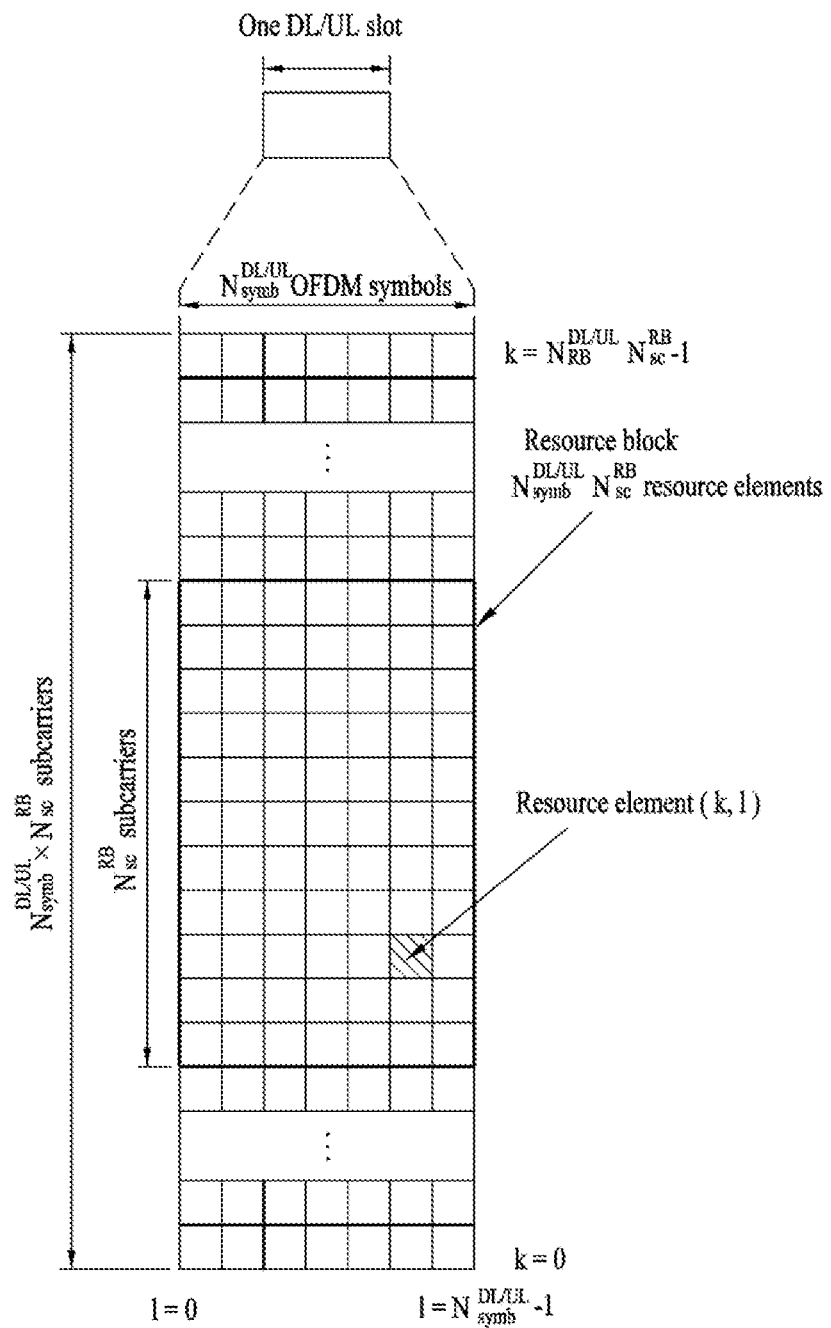
FIG. 2 illustrates the structure of a downlink (DL)/uplink (UL) slot in a wireless communication system.

FIG. 2 illustrates the structure of a DL/UL slot structure in a wireless communication system. Particularly, FIG. 2 illustrates the structure of a resource grid in the 3GPP LTE/LTE-A system. There is on resource grid per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, examples of the present disclosure are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

Two RBs each being located in one of two slots in a subframe, occupying the same $N^{RB}_{sc}$ consecutive subcarriers are referred to as a physical resource block (PRB) pair. The two RBs of a PRB pair have the same PRB number (or PRB index). A virtual resource block (VRB) is a kind of logical resource allocation unit introduced for resource allocation. A VRB is of the same size as a PRB. VRBs are categorized into localized VRBs and distributed VRBs depending on how VRBs are mapped to PRBs. The localized VRBs are mapped directly to PRBs, and thus VRB numbers (or VRB indexes) correspond directly to PRB numbers. That is, $n_{PRB} = n_{VRB}$. The localized VRBs are indexed as 0 to $N^{DL}_{VRB} - 1$, and $N^{DL}_{VRB} = N^{DL}_{RB}$. Accordingly, VRBs of the same VRB number are mapped to PRBs of the same PRB number in the first and second slots in the localized mapping scheme. In contrast, distributed VRBs are mapped to PRBs after interleaving. Accordingly, distributed VRBs of the same VRB number may be mapped to PRBs of different numbers in the first and second slots. Two PRBs of the same VRB number, each being located in one of two slots in a subframe are referred to as a VRB pair.

Figure 3:
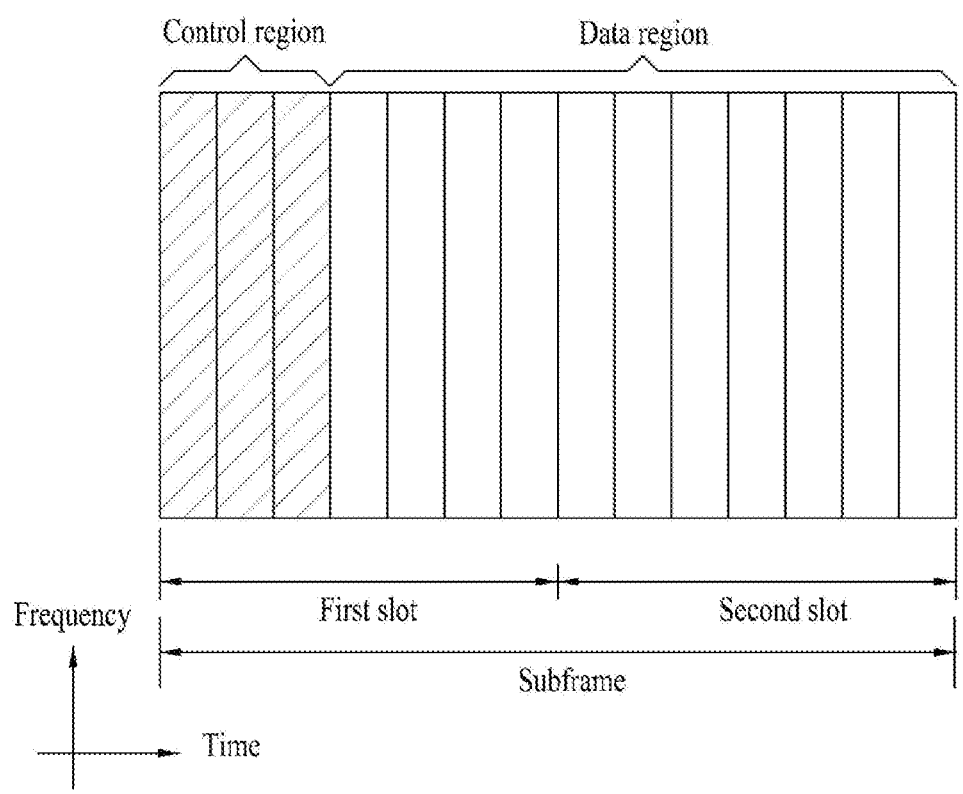
FIG. 3 illustrates the structure of a DL subframe used in a $3^{rd}$ generation partnership project long term evolution (3GPP LTE)/LTE-advanced (LTE-A) system.

FIG. 3 illustrates the structure of a DL subframe used in the 3GPP LTE/LTE-A system. Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. For example, the DCI includes a transmission format and resource allocation information for a downlink shared channel (DL-SCH), a transmission format and resource allocation information for an uplink shared channel (UL-SCH), paging information of a paging channel (PCH), system information of the DL-SCH, resource allocation information for an upper-layer control message such as a random access response transmitted on a PDSCH, a transmit power control command set for individual UEs of a UE group, a transmit power control command, indication information for activation of voice over IP (VoIP), a downlink assignment index (DAI), and so on. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to 9 REGs, and one REG corresponds to four REs. In a 3GPP LTE system, a set of CCEs on which a PDCCH may be located for each UE is defined. A CCE set in which the UE may detect a PDCCH thereof is referred to as a PDCCH search space or simply as a search space (SS). An individual resource on which the PDCCH may be transmitted in the SS is called a PDCCH candidate. A set of PDCCH candidates that the UE is to monitor is defined in terms of SSs. In the 3GPP LTE/LTE-A system, SSs for respective DCI formats may have different sizes, and a dedicated SS and a common SS are defined. The dedicated SS is a UE-specific SS (USS) and is configured for each individual UE. The common SS (CSS) is configured for a plurality of UEs. In a 3GPP LTE/LTE-A system, a set of CCEs on which a PDCCH may be located for each UE is defined. A CCE set in which the UE may detect a PDCCH thereof is referred to as a PDCCH search space or simply as a search space (SS). An individual resource on which the PDCCH may be transmitted in the SS is called a PDCCH candidate. A set of PDCCH candidates that the UE is to monitor is defined in terms of SSs, where a search space $S^{(L)}_k$ at aggregation level L□{1, 2, 4, 8} is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

TABLE 3

| Search Space $S_k^{(L)}$ | | | Number of PDCCH |
|---|---|---|---|
| Type | Aggregation Level L | Size[in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

One PDCCH candidate corresponds to 1, 2, 4, or 8 CCEs according to a CCE aggregation level. An eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

The eNB may transmit data to a UE or UE group in a data region. Data transmitted in the data region is referred to as user data. For transmission of user data, a physical downlink shared channel (PDSCH) may be allocated in the data region. A paging channel (PCH) and a DL-SCH are transmitted on the PDSCH. A UE may read data transmitted on a PDSCH by decoding control information transmitted on a PDCCH. Information regarding a UE or UE group to which data of the PDSCH is transmitted, and information regarding how the UE or UE group should receive and decode the PDSCH data may be transmitted on the PDCCH. For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

To demodulate a signal received from the eNB, the UE needs a reference signal (RS) to be compared with a data signal. An RS is a signal in a predefined special waveform, which the eNB or the UE transmits to the UE or the eNB or which is known to both of the eNB and the UE. The RS is also called a pilot. RSs are classified into cell-specific RS (CRS) common to all UEs within a cell and demodulated RS (DM RS) dedicated to a specific UE. A DM RS that the eNB transmits for demodulation of DL data at a specific UE is specially called a UE-specific RS. Only one or both of the DM RS and the CRS may be transmitted on DL. However, when only the DM RS without the CRS is transmitted on the DL, the DM RS to which the same precoder as that for data is applied may be used only for demodulation. Therefore, an RS for channel measurement should be provided separately. For example, an additional measurement RS, CSI-RS is transmitted to the UE to enable the UE to measure channel state information (CSI) in 3GPP LTE(-A). Compared to the CRS transmitted in each subframe, the CSI-RS is transmitted in every predetermined transmission period including a plurality of subframes, based on the property that a channel state does not change relatively much over time.

Figure 4:
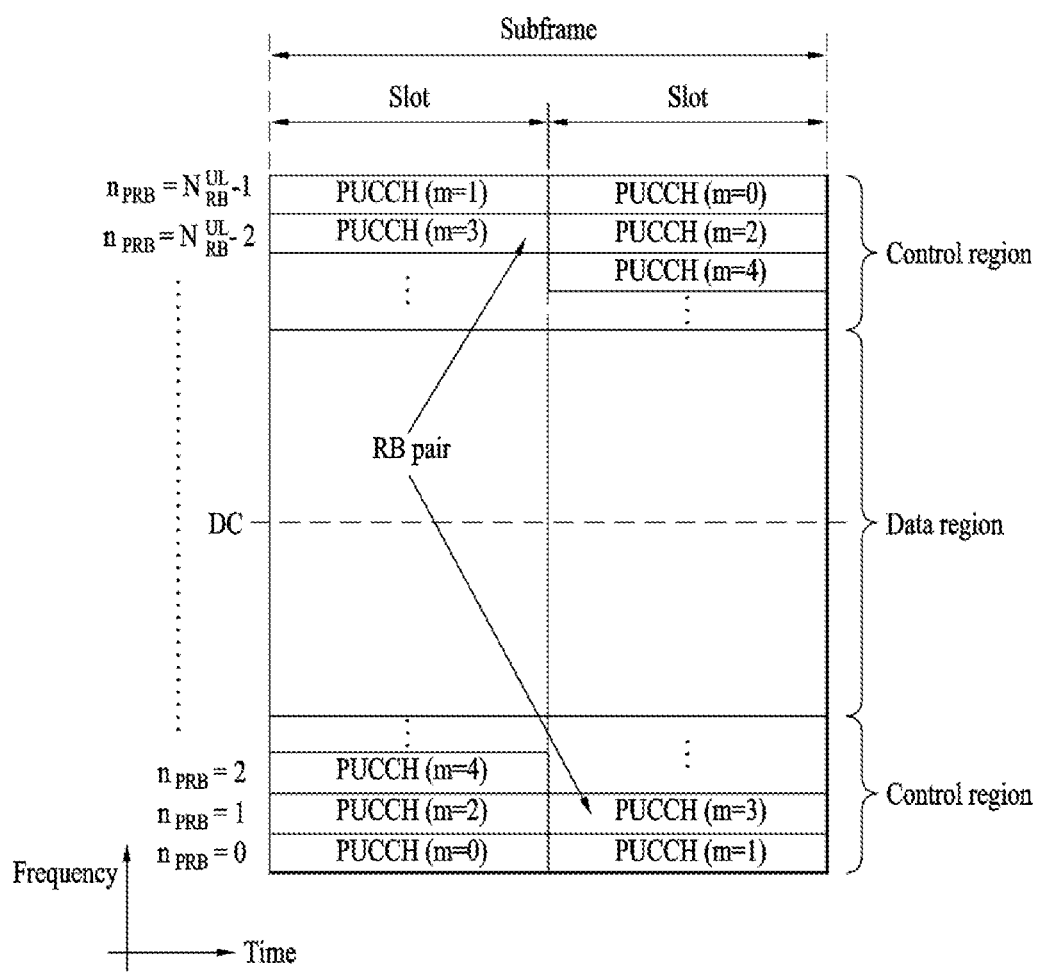
FIG. 4 illustrates the structure of a UL subframe used in the 3GPP LTE/LTE-A system.

FIG. 4 illustrates the structure of a UL subframe used in the 3GPP LTE/LTE-A system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. In the CSI, multiple input multiple output (MIMO) related feedback information includes the rank indicator (RI) and the precoding matrix indicator (PMI).

The amount of uplink control information (UCI) that the UE may transmit in a subframe depends on the number of SC-FDMA symbols available for transmission of control information. The SC-FDMA symbols available for the UCI refer to the remaining SC-FDMA symbols except for SC-FDMA symbols used for RS transmission in an SC-FDMA subframe, and also except for the last SC-FDMA symbol in a subframe with a sounding reference signal (SRS). The RS is used for coherent detection of a PUCCH. The PUCCH supports various formats according to the amount of transmitted information.

Table 4 illustrates mapping relationships between PUCCH formats and UCI in the LTE/LTE-A system.

TABLE 4

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, the PUCCH format 1 series are mainly used to deliver ACK/NACK information, the PUCCH format 2 series are mainly used to deliver channel state information (CSI) such as CQI/PMI/RI, and the PUCCH format 3 series are mainly used to deliver ACK/NACK information.

Reference Signal (RS)

When a packet is transmitted in a wireless communication system, the signal may be distorted during transmission because the packet is transmitted on a radio channel. To correctly receive the distorted signal, a receiver should compensate the received signal for the distortion based on channel information. Typically, a signal known to both the transmitter and the receiver is transmitted, and the channel information is obtained based on how much the signal is distorted during reception on the radio channel. This signal is called a pilot signal or a reference signal (RS).

When data is transmitted and received through multiple antennas, knowledge of the channel state between each transmission antenna and each reception antenna is required to receive a correct signal. Therefore, an RS should exist for each individual transmission antenna and more specifically for each individual antenna port.

RSs may be classified into UL RSs and DL RSs. In the current LTE system, the following UL RSs are defined.

i) Demodulation reference signal (DM-RS) for channel estimation for coherent demodulation of information transmitted over a PUSCH and a PUCCH ii) Sounding reference signal (SRS) in which a BS measures UL channel quality in different frequencies.

The following DL RSs are defined.

i) Cell-specific reference signal (CRS) shared by all UEs within a cell.

ii) UE-specific reference signal dedicated to a specific UE.

iii) DM-RS transmitted for coherent demodulation, when a PDSCH is transmitted.

iv) Channel state information reference signal (CSI-RS) for delivering CSI, when DL DMRS is transmitted.

v) Multimedia broadcast single frequency network (MBSFN) RS transmitted for coherent demodulation of a signal transmitted in an MBSFN mode.

vi) Positioning reference signal used to estimate information about the geographical location of a UE.

RSs may be classified into two types according to their purposes: RS for obtaining channel information and RS for data demodulation. Because the former is used for a UE to acquire DL channel information, it should be transmitted over a wide band and received even at a UE which does not receive DL data in a specific subframe. The former is also used in a situation such as handover. The latter is an RS that a BS transmits together with DL data in a corresponding resource, and a UE may demodulate data by receiving the RS and performing channel measurement. This RS should be transmitted in an area in which data is transmitted.

Transmit Power Control

Various parameters are used to control UL transmission power of a UE. These parameters may be classified into open-loop power control (OLPC) parameters and closed-loop power control (CLPC) parameters. An OLPC parameter may be a factor for controlling power by estimating and compensating for attenuation of a DL signal from a serving cell (or serving BS) to which the UE belongs. For example, if the distance between the UE and the serving cell increases and thus the DL signal is attenuated greatly, UL power may be controlled by increasing UL transmission power. A CLPC parameter is used to control UL power by directly transmitting information (e.g., a TPC command or the like) required to control UL transmission power by a BS. UL transmission power control is performed in consideration of both of OLPC and CLPC.

Specifically, a description will be given of PUSCH transmission power determination for PUSCH transmission of a UE. Equation 1 below is used to determine the transmission power of the UE, when only a PUSCH is transmitted, not simultaneously with a PUCCH, in subframe i in serving cell c.

$$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$

Equation 1

[dBm]

Equation 2 is used to determine PUSCH transmission power, when the PUCCH and the PUSCH are simultaneously transmitted in subframe i in serving cell c.

$$P_{PUSCH,c}(i) = \min \left\{ \begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$

Equation 2

[dBm]

Parameters which will be described below in relation to Equation 1 and Equation 2 are used to determine UL transmission power of the UE in serving cell c. $P_{CMAX,c}(i)$ in Equation 1 represents maximum allowed transmission power of the UE in subframe i, and $\hat{P}_{CMAX,c}(i)$ in Equation 2 represents a linear value of $P_{CMAX,c}(i)$. $\hat{P}_{CMAX,c}(i)$ in Equation 2 represents a linear value of $P_{PUCCH}(i)$ ($P_{PUCCH}(i)$ represents PUCCH transmission power in subframe i.

$M_{PUSCH,c}(i)$ in Equation 1 is a parameter representing the bandwidth of a PUSCH resource allocation, expressed as the number of valid RBs for subframe i, which is allocated by the BS. $P_{O\_PUSCH,c}(j)$ is a BS-indicated parameter which is the sum of a cell-specific nominal component $P_{O\_NOMINAL\_PUSCH,c}(j)$ provided by a higher layer and a UE-specific component $P_{O\_UE\_PUSCH,c}(j)$ provided by the higher layer. For a PUSCH transmission/retransmission corresponding to a dynamically scheduled grant, j=1, while for a PUSCH transmission/retransmission corresponding to a random access response grant, j=2. $P_{O\_UE\_PUSCH,c}(2)=0$, $P_{O\_NOMINAL\_PUSCH,c}(2)=P_{O\_PRE}+\Delta_{PREAMBLE\_Msg3}$, and parameters preambleInitialReceivedTargetPower ($P_{O\_PRE}$) and $\Delta_{PREAMBLE\_Msg3}$ are signaled by the higher layer.

$\alpha_c(j)$, which is a pathloss compensation factor provided by the higher layer, is a cell-specific parameter in 3 bits transmitted by the BS. When j=0 or 1, $\alpha_c \square \{0, 0.4, 0.5, 0.6, 0.7, 0.8, 0.9, 1\}$, and when j=2, $\alpha_c(j)=1$.

$PL_c$ is a DL pathloss (or signal loss) estimate in dB calculated by the UE, given as $PL_c$=referenceSignalPower— higher layer filtered reference signal received power (RSRP) where referenceSignalPower may be indicated to the UE by higher-layer signaling from the BS.

$f_c(i)$ is a value indicating a current PUSCH power control adjustment state for subframe i. The value may be a current absolute value or an accumulated value. If accumulation is enabled based on a parameter Accumulation-enabled provided by the higher layer or if a TPC command $\delta_{PUSCH,c}$ is included in a PDCCH, together with DCI format 0 with a CRC scrambled with a temporary C-RNTI, $f_c(i)=f_c(i-1)+\delta_{PUSCH,c}(i-K_{PUSCH})$ is satisfied, $\delta_{PUSCH,c}(i-K_{PUSCH})$ is signaled on a PDCCH together with DCI format 0/4 or DCI format 3/3A in subframe i-$K_{PUSCH}$. Herein, $f_c(0)$ is the first value after the accumulated value is reset.

In the LTE standards, the values of $K_{PUSCH}$ are defined as follows.

In frequency division duplex (FDD), $K_{PUSCH}$ is 4. For time division duplex (TDD) UL-DL configurations 0 to 6, $K_{PUSCH}$ has the values listed in Table 5 below. For TDD UL-DL configuration 0, the least significant bit (LSB) of a UL index is set to 1, and when a PUSCH transmission is scheduled with a PDCCH of DCI format 0/4 in subframe 2 or 7, $K_{PUSCH}=7$. For other PUSCH transmissions, the values of $K_{PUSCH}$ are given in Table 5.

TABLE 5

| DL-UL configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

Aside from discontinuous reception (DRX), the UE attempts to decode a PDCCH of DCI format 0/4 with a C-RNTI of the UE, or to decode a PDCCH of DCI format 3/3A with a TPC-PUSCH-RNTI of the UE and a DCI format for an SPS C-RNTI. When DCI format 0/4 and DCI format 3/3A for serving cell c are detected in the same subframe, the UE should use $\delta_{PUSCH,c}$ provided in DCI format 0/4. In the absence of a TPC command decoded for serving cell c, upon occurrence of DRX, or for i which indicates a subframe other than a UL subframe in TDD, $\delta_{PUSCH,c}=0$ dB.

Accumulated values of $\delta_{PUSCH,c}$ signaled together with DCI format 0/4 on a PDCCH are listed in Table 6 below. When the PDCCH with DCI format 0 is validated as an SPS activation or release PDCCH, $\delta_{PUSCH,c}=0$ dB. An accumulated value of $\delta_{PUSCH,c}$ signaled together with DCI format 3/3A on a PDCCH is one value of SET1 in Table 6, or one value of SET2 in Table 7 determined based on a TPC-index parameter provided by the higher layer.

TABLE 6

| TPC Command Field inDCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 7

| TPC Command Field in DCI format 3A | Accumulated $\delta_{PUSCH,c}$ [dB] |
|---|---|
| 0 | −1 |
| 1 | 1 |

When the maximum transmission power $P_{CMAX,c}(i)$ for serving cell c is exceeded, a positive TPC command is not accumulated for serving cell c. On the other hand, when the UE reaches minimum power, a negative TPC command is not accumulated.

When the value of $P_{O\_UE\_PUSCH,c}(j)$ is changed for serving cell c by the higher layer, and the UE receives a random access response message in a primary cell, the UE resets accumulation.

Unless accumulation is enabled based on the parameter Accumulation-enabled provided by the higher layer, $f_c(i)=\delta_{PUSCH,c}(i-K_{PUSCH})$ is satisfied. $\delta_{PUSCH,c}(i-K_{PUSCH})$ is signaled together with DCI format 0/4 on a PDCCH in subframe $i-K_{PUSCH}$.

$f_c(i)=f_c(i-1)$ for a subframe where no PDCCH with a DCI format is decoded for serving cell c, or where DRX occurs or i is not an UL subframe in TDD.

The first one of two types of values of $f_c(*)$ (accumulated value or current absolute value) is set as follows.

When $P_{O\_UE\_PUSCH,c}$ is changed for serving cell c by the higher layer, or when $P_{O\_UE\_PUSCH,c}$ is received by the higher layer and serving cell c is a secondary cell, $f_c(0)=0$. In contrast, when the serving cell is a primary cell, $f_c(0)=\Delta P_{rampup,c}+\delta_{msg2,c}$ where $\delta_{msg2}$ is a TPC command indicated by a random access response, and $\Delta P_{rampup}$ corresponds to total power ramp-up from the first preamble to the last preamble and is provided by the higher layer.

Further, when a TPC command is executed in an accumulation mode in UL power control (ULPC) in relation to the present disclosure, it is regulated in related technology to use an accumulated value in the following manner. When the value of $P_{O\_UE\_PUSCH,c}(j)$ is changed for serving cell c by the higher layer and the UE receives a random access response message in a primary cell, the UE should reset accumulation in the following case.

Equation 3 is a related equation for ULPC of a PUCCH.

$$P_{PUCCH,c}(i) = \min \begin{Bmatrix} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{Bmatrix}$$

[dBm]

Equation 3

In Equation 3, i is a subslot/slot/subframe index, and c is a cell index. If the higher layer configures the UE to transmit a PUCCH through two antenna ports, the value of $\Delta_{TxD}(F)$ is provided to the UE by the higher layer, and otherwise, $\Delta_{TxD}(F)$ is 0. The parameters described below are for serving cell c.

$P_{CMAX,c}(i)$ represents the maximum allowed transmission power of the UE and $P_{0\_PUCCH}$ is a parameter being the sum of cell-specific parameters, which are indicated by higher-layer signaling from the BS. $PL_c$ is a DL pathloss (or signal loss) estimate in dB calculated by the UE, given as $PL_c$=referenceSignalPower−higher layer filtered RSRP. h(n) changes according to a PUCCH format, $n_{CQI}$ is the number of information bits in a channel quality indicator (CQI), and $n_{HARQ}$ is the number of HARQ bits. A $\Delta_{F\_PUCCH}(F)$ value is a relative value with respect to PUCCH format 1a, which corresponds to PUCCH format (F) and is indicated by higher-layer signaling from the BS.

g(i) represents a current PUCCH power control adjustment state in subframe i, and may be defined by $$g(i) = g(i-1) + \sum_{m=0}^{M-1} \delta_{PUCCH}(i - k_m)$$

where $\delta_{PUCCH}$ may be given according to Table 8 or Table 9 below, and M is the number of DL subframes associated with one UL subframe.

$h(n_{CQI},n_{HARQ},n_{SR})$ is 0 in PUCCH formats, 1, 1a and 1b, $$h(n_{CQI}, n_{HARQ}, n_{SR}) = \frac{(n_{HARQ}-1)}{2} \qquad \text{Equation 3}$$

when one extra serving cell is configured for the UE by PUCCH format 1b, and 0 in other cases. Further, $h(n_{CQI}, n_{HARQ}, n_{SR})$ is given by Equation 4 in the case of a normal cyclic prefix (CP) in PUCCH formats 2, 2a and 2b, and by Equation 5 in the case of an extended CP in PUCCH format 2.

$$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise} \end{cases} \quad \text{Equation 4}$$

$$h(n_{CQI}, n_{HARQ}, n_{SR}) = \qquad \text{Equation 5}$$
$$\begin{cases} 10\log_{10}\left(\frac{n_{CQI}+n_{HARQ}}{4}\right) & \text{if } n_{CQI}+n_{HARQ} \geq 4 \\ 0 & \text{otherwise} \end{cases}$$

When the UE transmits an HARQ-ACK/NACK or SR of 11 or more bits in PUCCH format 3, $h(n_{CQI},n_{HARQ},n_{SR})$ may be given by Equation 6 and otherwise, by Equation 7.

$$h(n_{CQI}, n_{HARQ}, n_{SR}) = \frac{n_{HARQ}+n_{SR}-1}{3} \qquad \text{Equation 6}$$

$$h(n_{CQI}, n_{HARQ}, n_{SR}) = \frac{n_{HARQ}+n_{SR}-1}{2} \qquad \text{Equation 7}$$

When the value of $P_{0\_UE\_PUCCH}$ is changed by the higher layer, $g(0)=0$ and otherwise, $g(0)=\Delta P_{rampup}+\delta_{msg2}$ where $\delta_{msg2}$ is a TPC command indicated by a random access response, and $\Delta P_{rampup}$ corresponds to total power ramp-up from the first preamble to the last preamble, provided by the higher layer.

When maximum transmission power $P_{CMAX,c}(i)$ for primary cell c is exceeded, a positive TPC command is not accumulated for primary cell c. On the other hand, when the UE reaches minimum power, a negative TPC command is not accumulated. When the value of $P_{0\_UE\_PUCCH}$ is changed by the higher layer or a random access response message, msg2 is received, the UE resets the accumulation.

Table 8 and Table 9 below list $\delta_{PUCCH}$ values in a TPC command field of a DCI format.

TABLE 8

| TPC Command Field in DCI format 1A/1B/1D/ 1/2A/2B/2C/2/3 | $\delta_{PUCCH}$ [dB] |
| --- | --- |
| 0 | -1 |
| 1 | 0 |
| 2 | 1 |
| 3 | 3 |

TABLE 9

| TPC Command Field in DCI format 3A | $\delta_{PUCCH}$ [dB] |
| --- | --- |
| 0 | -1 |
| 1 | 1 |

In order to satisfy requirements for various application fields, it may be considered to configure various transmission time intervals (TTIs) (or various TTI lengths) for all or a specific physical channel in the next-generation system. In more particular, a TTI during which a physical channel such as a PDCCH/PDSCH/PUSCH/PUCCH is transmitted may be set to be less than 1 msec to reduce latency for communication between an eNB and a UE according to a scenario (such a PDCCH/PDSCH/PUSCH/PUCCH is referred to as an sPDCCH/sPDSCH/sPUSCH/sPUCCH). For a single UE or multiple UEs, a plurality of physical channels may exist in a single subframe (e.g., 1 msec), and have different TTIs (or TTI lengths). The following examples will be described in the context of an LTE system, for the convenience of description. A TTI may be 1 msec (normal TTI), the length of a normal subframe used in the LTE system, and a short TTI is a TTI shorter than the normal TTI, spanning one or more OFDM or SC-FDMA symbols. While a short TTI (i.e., a TTI shorter than a legacy one subframe) is taken for the convenience of description, the key features of the present disclosure may be extended to a TTI longer than one subframe or equal to or longer than 1 ms. In particular, the key features of the present disclosure may also be extended to a short TTI which is introduced to the next-generation system by increasing a subcarrier spacing. Although the present disclosure is described in the context of LTE, for convenience, it is applicable to a technology using a different waveform/frame structure such as new radio access technology (RAT). In general, the present disclosure is based on the assumption of an sTTI (<1 msec), a longTTI (=1 msec), and a longerTTI (>1 msec). While a plurality of UL channels with different TTI lengths/numerologies/processing times have been described above, it is apparent that the following examples may be extended to a plurality of UL/DL channels to which different service requirements, latencies, and scheduling units are applied.

Figure 5:
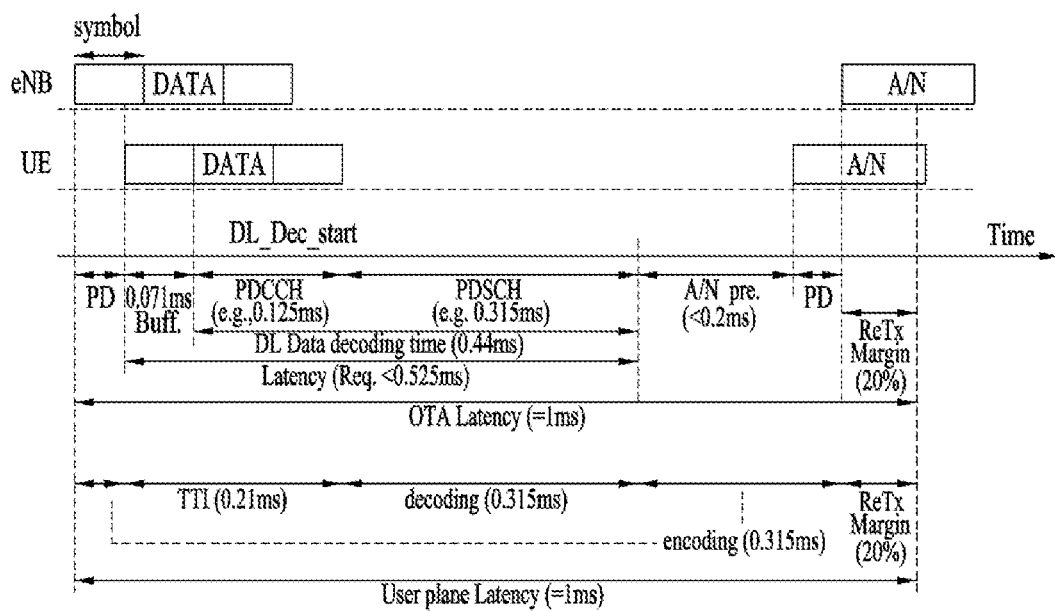
FIG. 5 illustrates reduction of a transmission time interval (TTI) length due to reduction of a user-plane latency.

To fulfill the above-described latency reduction, that is, low latency, there is a need for designing a new shortened TTI (sTTI) of 0.5 msec or less by shortening the minimum data transmission unit, TTI. For example, to reduce the user plane (U-plane) latency from the beginning of data (PDCCH and PDSCH) transmission from a BS to complete transmission of an A/N (or ACK/NACK) from a UE to 1 msec as illustrated in FIG. 5, an sTTI may be configured in units of 3 OFDM symbols.

Figure 6:
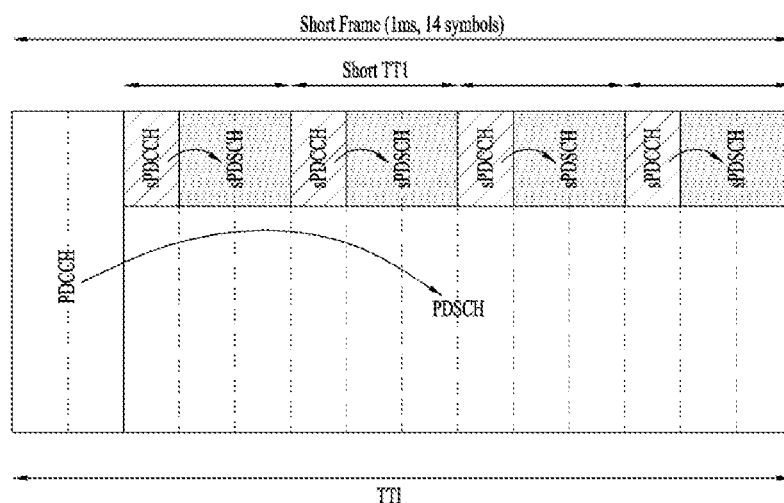
FIG. 6 illustrates an example of a plurality of shortened TTIs (sTTIs) configured in one subframe.

In a DL environment, a PDCCH (i.e., sPDCCH) designed for transmission/scheduling of data in an sTTI, and a PDSCH (i.e., sPDSCH) designed to be transmitted in an sTTI may be transmitted in such an sTTI. For example, as illustrated in FIG. 6, a plurality of sTTIs may be configured with different OFDM symbols in one subframe. In particular, OFDM symbols included in the sTTI may be configured to exclude OFDM symbols carrying legacy control channels. In the sTTI, an sPDCCH and an sPDSCH may be transmitted in time division multiplexing (TDM) in different OFDM symbol regions, or in frequency division multiplexing (FDM) in different PRB regions/frequency resources.

Like the above-described DL environment, data may be transmitted/scheduled in a sTTI in a UL environment, and channels corresponding to the existing TTI-based PUCCH and PUSCH are referred to as sPUCCH and sPUSCH.

Figure 7:
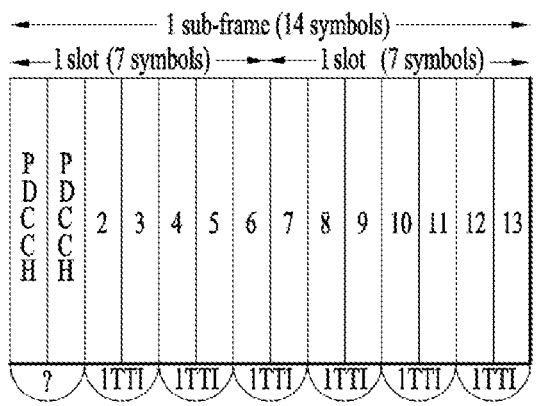
FIG. 7 illustrates the structures of DL subframes including sTTIs of a plurality of lengths (a plurality of numbers of symbols).
Figure 7:
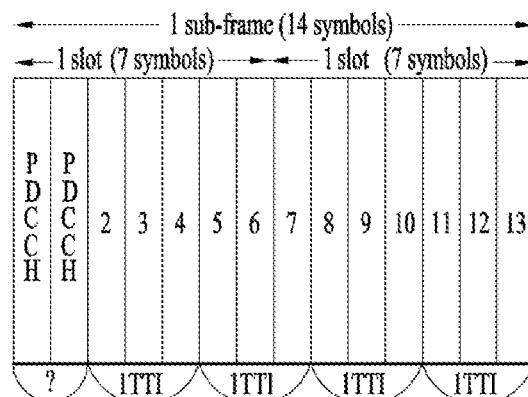
Figure 7:
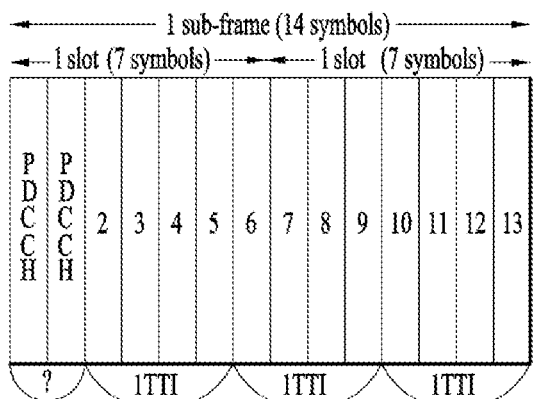
Figure 7:
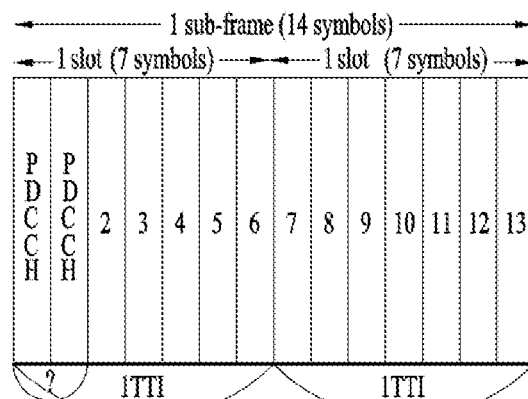

The present disclosure is described in the context of the LTE/LTE-A system. In the legacy LTE/LTE-A system, a 1-ms subframe includes 14 OFDM symbols in the case of a normal CP When a TTI is configured to be shorter than 1 ms, a plurality of TTIs may be included in one subframe. In a method of configuring a plurality of TTIs, two symbols, three symbols, four symbols, and seven symbols may be configured as one TTI, as illustrated in FIG. 7. Although not shown, a TTI spanning one symbol may also be considered. If one symbol is one TTI unit, 12 TTIs are formed on the assumption that the legacy PDCCH is transmitted in two OFDM symbols. Similarly, as illustrated in FIG. 7A, when two symbols are one TTI unit, six TTIs may be formed. When three symbols are one TTI unit, four TTIs may be formed as illustrated in FIG. 7B. When four symbols are one TTI unit, three TTIs may be formed as illustrated in FIG. 7(c). In this case, it is assumed that the legacy PDCCH is transmitted in the first two OFDM symbols.

As illustrated in FIG. 7(d), when seven symbols are configured as one TTI, one TTI of seven symbols carrying the legacy PDCCH and one TTI of the next seven symbols may be configured. If one TTI is configured with seven symbols, a UE supporting sTTI may assume that the first two OFDM symbols carrying the legacy PDCCH have been punctured or rate-matched and the following five symbols carry data and/or control information for the UE in the TTI (first slot) located at the former part of one subframe. For the TTI (second slot) located in the latter part of the subframe, the UE assumes that data and/or control information may be transmitted in all of the seven symbols without any puncturing or rate-matching resource regions.

Figure 8:
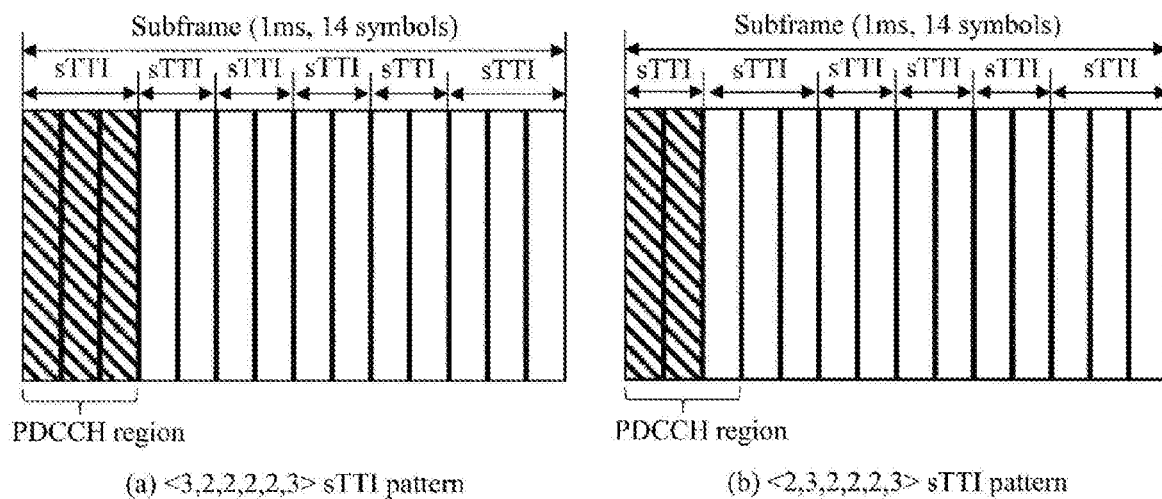
FIG. 8 illustrates the structures of DL subframes including 2-symbol or 3-symbol sTTIs.

In the present disclosure, an sTTI structure in which an sTTI spanning two OFDM symbols (hereinafter, referred to as "OSs") coexists with an sTTI spanning three OSs as illustrated in FIG. 8 is also considered. A 2-OS or 3-OS sTTI may be simply defined as a 2-symbol sTTI (i.e., a 2-OS sTTI). Further, a 2-symbol sTTI or 3-symbol sTTI may be referred to simply as a 2-symbol TTI or 3-symbol TTI. All of these sTTIs are shorter than the legacy 1-ms TTI according to the present disclosure. That is, despite the term "TTI", it does not mean that the TTI is not an sTTI, and the present disclosure relates to a communication scheme in a system configured with a TTI shorter than the legacy TTI, irrespective of the appellation.

Further, in the present disclosure, a numerology refers to determining the length of a TTI, a subcarrier spacing, and so on to be applied to the wireless communication system, a parameter such as a determined TTI length or subcarrier spacing, or a communication structure or system based on the parameter.

In the <3,2,2,2,2,3> sTTI pattern illustrated in FIG. 8(a), an sPDCCH may also be transmitted according to the number of symbols in a PDCCH. In the <2,3,2,2,2,3> sTTI pattern illustrated in FIG. 8(b), transmission of an sPDCCH may be difficult because of the legacy PDCCH region.

New Radio Technology (NR)

While the structure, operation, or function of the 3GPP LTE(-A) system has been described above, the structure, operation, or function of the 3GPP LTE(-A) system may be slightly modified or implemented in other ways in NR. Some of the modifications and implementations will be briefly described.

In NR, various numerologies are supported. For example, a subcarrier spacing of up to a $2^n$ multiple of 15 KHz (n=1, 2, 3, 4) as well as a subcarrier spacing of 15 KHz is supported.

Further, in the case of a normal CP, although the number of OFDM symbols (hereinafter, simply referred to as "symbols") per slot is fixed to 14, the supported number of slots in one subframe is up to $2^k$ (k=0, 1, 2, 3, 4, and 5) and a radio frame includes 10 subframes as in the legacy LTE system. In the case of an extended CP, the number of symbols per slot is fixed to 12, and one subframe includes 4 slots. Further, one resource block (RB) is defined as 12 consecutive subcarriers in the frequency domain, as in the legacy LTE system.

Further, the use (e.g., DL, UL, or flexible) of each symbol in one slot may be defined according to a slot format, and both a DL symbol and a UL symbol may be configured in one slot. This case is referred to as a self-contained subframe (or slot) structure.

The present disclosure is devised to handle a UL transmission method of a UE that supports different TTI lengths.

In the legacy LTE standard, a UE having a PUCCH/PUSCH simultaneous transmission capability may report the related capability to a network and the network may configure PUCCH/PUSCH simultaneous transmission for the UE. In this case, the UE may simultaneously transmit a PUCCH and a PUSCH instead of piggybacking UCI of the PUCCH on the PUSCH, thereby performing more efficient UL transmission.

With introduction of an sTTI, a UE operation needs to be defined for a case where there is an sPUSCH or an sPUCCH in a state in which the PUCCH and the PUSCH are scheduled to be simultaneously transmitted at a specific timing for the UE configured with PUCCH/PUSCH simultaneous transmission. Alternatively, the UE operation needs to be defined for a case where there is a PUCCH or a PUSCH with a TTI length=y (y<x) in a state in which a PUCCH and a PUSCH with a TTI length=x are scheduled to be simultaneously transmitted at a specific timing. More generally, the UE operation needs to be defined for a case where there are a PUCCH/PUSCH having a specific processing time (or a specific numerology such as a subcarrier spacing) and another PUCCH/PUSCH having a shorter (or longer) processing time (or numerology such as a subcarrier spacing). Specific examples of a proposed UE operation in the above situation will be given below. More characteristically, although the channels may be transmitted by one UE, the channels may be transmitted by a plurality of UEs. In this case, it is assumed that information about channels transmitted by other UEs is known.

Alternatively, it may be assumed that such simultaneous transmission is basically supported between channels. Even in this case, simultaneous transmission may or may not be configured. However, even though simultaneous transmission is configured, simultaneous transmission may not be performed in a carrier of one UE in the following cases:

case in which a channel transmitted in OFDM partially or fully overlaps with a channel transmitted in discrete Fourier transform-spread-OFDM (DFT-s-OFDM), case in which channels having different numerologies partially or fully overlap (it is assumed that a UE does not support more than one numerologies), case in which a physical random access channel (PRACH) partially or fully overlaps with another channel during transmission of the PRACH, and case in which aPUSCH/PUCCH/SRS is transmitted in one carrier during sidelink transmission.

When the UE is configured with simultaneous transmission except for the above cases in which simultaneous transmission is not performed, it is assumed that the UE performs simultaneous transmission unless transmission power of the UE is limited. In a power-limited case, simultaneous transmission may be restricted. The power-limited case may include the case in which a required power level is higher than the maximum power of the UE or the case in which demodulation performance is expected to be degraded due to a transient period caused by the structure of a power amplifier (AMP). Hereinafter, the case in which power is limited will be referred to as a "power-limited case".

Hereinbelow, processing of simultaneous transmission of the UE when the UE supports a plurality of TTI lengths in a carrier aggregation (CA) situation will be described.

In the CA situation, it is necessary to determine simultaneous transmission for a combination of a plurality of UL channels having different TTI lengths, different numerologies, and/or different processing times, in consideration of UL power control. Therefore, in the CA situation, whether to allow simultaneous transmission of a specific combination of a plurality of UL channels having different TTI lengths, different numerologies, and/or different processing times (for example, PUCCH/PUSCH, sPUCCH/sPUSCH, sPUCCH/PUSCH, PUCCH/sPUSCH, PUSCH/sPUSCH, PUCCH/sPUCCH, or PUCCH/PUSCH having different TTI lengths (or different numerologies/processing times), or PUSCH/PUSCH having different TTI lengths (or different numerologies/processing times), or PUCCH/PUCCH having different TTI lengths (or different numerologies/processing times)) may be determined as follows. Characteristically, this rule may be applied in determining whether to perform simultaneous transmission of a combination of a plurality of UL channels transmitted in a plurality of cells within a specific PUCCH group, and/or determining power allocation for the plurality of UL channels.

Alt 1: In a power-limited case, a rule may be defined such that handling for a combination of a plurality of UL channels having different TTI lengths, different numerologies, and/or different processing times conforms to handling of a plurality of UL channel combinations in a single-carrier situation.

For example, the handling of a combination of a plurality of UL channels in the single-carrier situation may always include dropping/stopping, puncturing, and/or power reduction of a specific UL channel (e.g., a low-priority channel including a channel having a longer TTI length and/or a shorter subcarrier spacing). In the power-limited case, even when the network configures (or allows) simultaneous transmission, the UE may further perform handling of a combination of a plurality of UL channels.

In a non-power-limited case, a rule may be defined such that whether to perform simultaneous transmission is determined according to whether simultaneous transmission is configured by the network.

Characteristically, if simultaneous transmission is allowed, a rule may be defined such that that guaranteed power is set for a specific UL channel (e.g., a high-priority channel including a channel having a shorter TTI length and/or a longer subcarrier spacing), and only remaining power is allocated to another channel (e.g., a lower-priority channel including a channel having a longer TTI length and/or a shorter subcarrier spacing).

Alt 2: A rule may be defined such that, while a combination of a plurality of UL channels having different TTI lengths, different numerologies, and/or different processing times conforms to a simultaneous transmission configuration, power scaling (reduction) is performed for a specific UL channel (e.g., a high-priority channel including a channel having a shorter TTI length and/or a longer subcarrier spacing, and/or a channel of which transmission starts later than other(s)) only when simultaneous transmission is allowed and power is limited.

Alt 3: A rule may be defined such that a combination of a plurality of UL channels conforms to handling of a combination of a plurality of UL channels in the single-carrier situation (e.g., dropping/stopping, puncturing, and/or power reduction), irrespective of whether power is limited.

Alt 4: In the power-limited case, a rule may be defined such that channels are power-reduced and/or dropped starting from a channel having a low priority in order, in consideration of a TTI length/processing time/subcarrier spacing.

More characteristically, in the power-limited case, a rule may be defined such that channels are power-reduced and/or dropped starting from a channel having a longer TTI length, a longer processing time, and/or a shorter subcarrier spacing in order, and then, if there are channels having the same TTI length/processing time/subcarrier spacing, the channels are power-reduced and/or dropped starting from a channel having a low priority in order, in consideration of channels types (e.g., a data channel, a control channel, a random access channel, an aperiodic SRS, a periodic SRS and etc.). Alternatively, a rule may be defined such that channels are power-reduced and/or dropped starting from a channel having a low priority in order, in consideration of a TTI length/processing time/subcarrier spacing, a channel type, whether UCI is included, whether a DMRS is included (e.g., a channel including the DMRS may have a high priority), a UCI type (e.g., SR, HARQ-ACK, CSI, or SRS), and/or a cell index.

For example, the channels may be prioritized by sequentially considering TTI length/processing time/subcarrier spacing>channel type>whether UCI is included. That is, the TTI length/processing time/subcarrier spacing has a higher priority than the channel type, and the channel type has a higher priority than whether the UCI is included.

In another example, the channels may be prioritized by sequentially considering TTI length/processing time/subcarrier spacing>whether UCI is included>channel type. Alternatively, the channels may be prioritized by sequentially considering whether UCI is included>channel type>TTI length/processing time/subcarrier spacing. Characteristically, the power reduction and/or dropping operation may be performed until a non-power-limited condition is satisfied.

Alt 5: A rule may be defined such that a channel having a high priority is selected per TTI length/numerology/processing time, and then a channel having a high priority is selected from among remaining channels having different TTI lengths/numerologies/processing times. For example, if transmission timings of an sPUCCH, an sPUSCH, a PUCCH, and a PUSCH overlap or collide with each other, the sPUCCH and the PUCCH may be dropped in consideration of priorities between the sPUSCH and the sPUCCH and priorities between the PUCCH and the PUSCH. Next, whether to simultaneously transmit the sPUSCH and the PUSCH based on one of the above-described methods may be determined.

Alt 6: A rule may be defined such that a channel having a higher priority is selected per CC and then a channel having a higher priority is selected from among remaining channels having different TTI lengths/numerologies/processing times. For example, when transmission timings of an sPUCCH (CC 1), an sPUSCH (CC 2), a PUCCH (CC 1), and a PUSCH (CC 2) overlap or collide with each other, the PUCCH may be dropped in consideration of priorities between the sPUCCH and the PUCCH of CC 1, and the PUSCH may be dropped in consideration of priorities between the sPUSCH and the PUSCH of CC 2. Then, whether to simultaneously transmit the remaining channels, i.e., the sPUCCH and sPUSCH, based on one of the above-described methods may be determined.

When plural channels belonging to different PUCCH groups have different TTI lengths/numerologies/processing times and transmission timings thereof overlap or collide, a rule may be defined such that a channel having a lower priority is dropped. The channels may be prioritized in consideration of a PUCCH group (e.g., a primary PUCCH group may have a higher priority than a secondary PUCCH group), a TTI length/processing time/subcarrier spacing, a channel type, whether UCI is included, whether a DMRS is included (e.g., a channel including the DMRS may have a high priority), a UCI type (e.g., SR, HARQ-ACK, CSI, or SRS), and/or a cell index. It may not be possible to allocate much power to a channel of which transmission starts earlier than other(s) although it is desired to allocate much power to a channel of which transmission starts earlier than other(s), if minimum guaranteed power has been set for the PUCCH groups. The above method may be used upon considering that this sub-optimal power allocation is undesirable. Characteristically, whether channel dropping is enabled in a collision case across the PUCCH groups may be configured for the UE through a higher layer signal or DCI. Alternatively, the channel dropping operation may be configured according to a power control mode based on PCM2 guaranteed power.

Characteristically, a rule may be defined such that channel dropping in a collision case across the PUCCH groups is performed only for a channel without UCI. When dropping of a specific channel including UCI of another PUCCH group (more characteristically, a shorter-TTI channel including the UCI) is demanded due to PUSCH, PUCCH, and/or SRS that does not include UCI in a specific PUCCH group, "PUSCH, PUCCH, and/or SRS that does not include UCI" may be dropped and power may be concentratively allocated to the specific channel including the UCI. As another method, a rule may be defined such that UCI of a channel to be dropped in a collision case across the PUCCH groups is piggybacked on a channel of another PUCCH group. In other words, a rule may be defined such that UCI piggybacking between the PUCCH groups is allowed while dropping is performed in a collision case between the PUCCH groups. This serves to minimize loss of the UCI caused by dropping.

When overlapping or collision occurs in time between transmission timings of a plurality of UL channels having different numerologies (e.g., TTL lengths or subcarrier spacings), a method of piggybacking UCI of a UL channel having a specific numerology (e.g., a longer-TTI UL channel) on a UL channel having another numerology (e.g., a shorter-TTI UL channel) while stopping/dropping transmission of the UL channel having the specific numerology is considered.

Characteristically, when UCI of a longer-TTI PUCCH is piggybacked on a shorter-TTI PUCCH, a rule may be defined such that whether to piggyback specific UCI is determined in consideration of a payload size of the UCI and/or a format (or a container size) of the shorter-TTI PUCCH. As an example, when a PUSCH and an sPUCCH collide, a rule may be defined such that CSI of the PUSCH is not piggybacked on an sPUCCH of a small payload and is piggybacked on an sPUCCH of a large payload. More characteristically, if it is desired to piggyback the CSI of the PUSCH when the PUSCH and the sPUCCH collide, a rule may be defined such that the CSI of the PUSCH is not piggybacked on an sPUCCH of a payload of x or less bits, only CQI is piggybacked on an sPUCCH of a payload which exceeds x bits and is y or less bits, and CQI and RI are piggybacked on an sPUCCH of a payload exceeding y bits.

When overlapping or collision occurs between transmission timings of a plurality of UL channels having different TTL lengths or subcarrier spacings, a method of piggybacking UCI of a UL channel having a specific TTI length and/or a specific subcarrier spacing (e.g., a UL channel having a longer TTI length or a smaller subcarrier spacing) on a UL channel having another TTI length and/or another subcarrier spacing (e.g., a UL channel having a shorter TTI or a larger subcarrier spacing) while stopping/dropping transmission of the UL channel having the specific TTI length and/or the specific subcarrier spacing may be considered.

In this case, the UE may report on whether an operation of piggybacking UCI of the stopped/dropped channel on another channel is possible through capability signaling. The network may provide the UE with a configuration regarding whether to perform the operation of piggybacking the UCI of the dropped/dropped channel on another channel. A rule may be defined such that the UE performs the piggybacking operation when the configuration is enabled. The capability signaling and/or the network signaling may be independently and differently reported/configured according to a TTI length and/or a numerology of a channel to be finally transmitted (a channel on which UCI is to be piggybacked according to whether piggybacking is possible). Alternatively, the capability signaling and/or the network signaling may be independently and differently reported/configured according to an sTTI length combination and/or a processing time.

Characteristically, the capability signaling and/or the network configuration may be differently and separately reported/configured according to a type of UCI to be piggybacked. Alternatively, the capability signaling and/or the network configuration may be differently and separately reported/configured according to a combination of UCI to be piggybacked or may be reported/configured with respect to possible (or impossible) combinations of the UCI. As an example, when A/N only and CSI only may be piggybacked but A/N+CSI may not be piggybacked, the UE may report a UCI type that may be piggybacked to the network. Then, the network may be aware of which UCI is capable of being received among UCI of dropped/stopped channels.

The capability signaling and/or the network configuration may be differently and separately reported/configured according to a payload size of UCI to be piggybacked (or the number of bits of HARQ-ACK, the total number of codewords, the total number of cells, the number of CSI processes, or a combination thereof).

As another method, the UE may report capability signaling for a minimum processing time required for an operation of piggybacking the UCI of the stopped/dropped channel on another channel and transmitting the UCI. In addition, a rule may be defined such that whether to perform the operation of piggybacking the UCI of the stopped/dropped channel on another channel may be determined according to an sTTI length combination, a numerology, a TTI length, and/or a processing time, configured for the UE (without additional configuration).

In a CA situation, whether the UE may simultaneously transmit a plurality of UL channels having different TTI lengths on different carriers may be determined according to a radio frequency (RF) structure of the UE. For example, when transmission of channels having different TTI lengths shares one RF chain, since it is difficult to maintain power of a channel having a longer TTI length during the corresponding TTI length, phase continuity may be broken and performance of the corresponding channel may be degraded. Therefore, in this situation, simultaneous transmission may not be desirable. When transmission of channels having different TTI lengths is performed through different RF chains, the above problem does not occur and simultaneous transmission may be supported.

Characteristically, when the UE has no simultaneous transmission capability (in this case, simultaneous transmission capability may be defined per band and/or per band combination) for a combination of a plurality of UL channels having different TTI lengths, different numerologies, and/or different processing times in a CA situation, a rule may be defined such that all channels having a longer TTI length, a longer processing time, and/or a shorter subcarrier spacing are dropped/stopped.

In the above case or in the case in which some of channels are dropped/stopped due to power limitation although the UE may perform simultaneous transmission, a method of transmitting UCI, which should have been transmitted through the dropped/stopped channel, through a channel that is not dropped/stopped may be considered. Specifically, the following methods are proposed to determine which one of channels that are not dropped/stopped is selected to transmit UCI.

Option 1: UCI of a dropped/stopped channel may be transmitted first through a channel having the same TTI length, the same numerology, and/or the same processing time as the dropped/stopped channel. Since it is expected that priorities of channels having different TTI lengths among channels that are not dropped/stopped will be higher than priorities of channels having the same TTI lengths, degradation of channel performance caused by piggybacking the UCI on a channel of a high priority may be prevented. In this sense, the UCI of the dropped/stopped channel may be transmitted first through a channel having a long TTI length among the channels that are not dropped/stopped.

Option 2: UCI may be piggybacked on a channel having a high priority, in consideration of a TTI length/processing time/subcarrier spacing, a channel type, whether UCI is included, whether a DMRS is included (e.g., a channel including a DMRS may have a high priority), a UCI type (e.g., SR, HARQ-ACK, CSI, or SRS), and/or a cell index, among channels that are not dropped/stopped. For example, UCI of a dropped/stopped channel may be piggybacked first on a channel having a low cell index among the channels that are not dropped/stopped.

Option 3: UCI may be piggybacked on a channel having the highest priority, in consideration of a TTI length/processing time/subcarrier spacing, a channel type, whether UCI is included, whether a DMRS is included (e.g., a channel including the DMRS may have a high priority), a UCI type (e.g., SR, HARQ-ACK, CSI, or SRS), and/or a cell index, among channels that are not dropped/stopped. Characteristically, UCI piggybacking between different PUCCH/cell groups is not allowed and UCI of a channel to be dropped/stopped may be piggybacked on the channel having the highest priority among channels considering only the other factors (a TTI length/processing time/subcarrier spacing, a channel type, whether UCI is included, whether a DMRS is included, a UCI type, and/or a cell index). In other words, the UCI of the channel to be dropped/stopped may be piggybacked on the channel having the highest priority among channels in the same PUCCH/cell group as the dropped/stopped channel.

Since examples of the above proposed methods may be included as one of methods of implementing the present disclosure, it is apparent that the examples may be regarded as proposed methods. Further, the foregoing proposed methods may be implemented independently, or some of the methods may be implemented in combination (or merged). Further, it may be regulated that information indicating whether the proposed methods are applied (or information about the rules of the proposed methods) is indicated to a UE by a pre-defined signal (or a physical-layer or higher-layer signal) by a BS.

Figure 9:
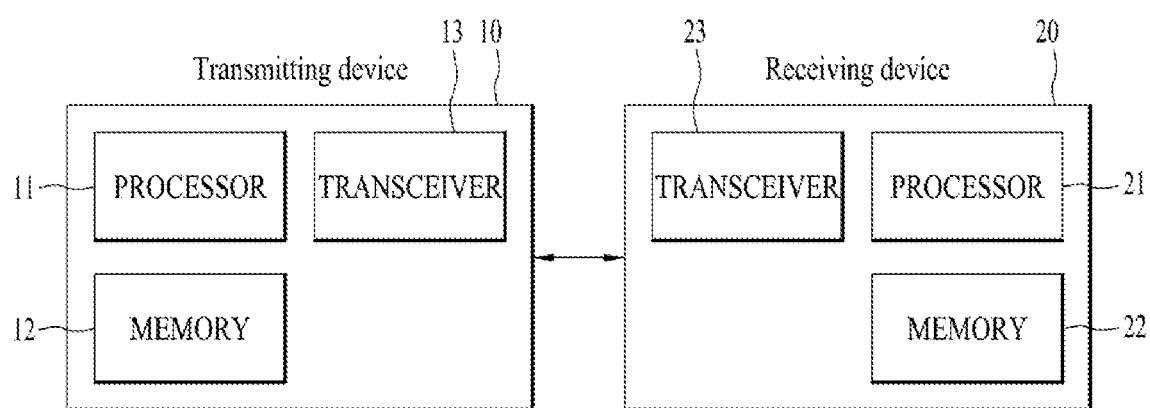
FIG. 9 is a block diagram of devices for implementing the example(s) of the present disclosure.

FIG. 9 is a block diagram illustrating elements of a transmitting device 10 and a receiving device 20 for implementing the present disclosure. The transmitting device 10 and the receiving device 20 respectively include transceivers 13 and 23 capable of transmitting and receiving radio signals carrying information, data, signals, and/or messages, memories 12 and 22 for storing information related to communication in a wireless communication system, and processors 11 and 21 operationally connected to elements such as the transceivers 13 and 23 and the memories 12 and 22 to control the elements and configured to control the memories 12 and 22 and/or the transceivers 13 and 23 so that a corresponding device may perform at least one of the above-described examples of the present disclosure.

The memories 12 and 22 may store programs for processing and controlling the processors 11 and 21 and may temporarily store input/output information. The memories 12 and 22 may be used as buffers. The processors 11 and 21 generally control the overall operation of various modules in the transmitting device and the receiving device. Especially, the processors 11 and 21 may perform various control functions to implement the present disclosure. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present disclosure is implemented using firmware or software, the firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the transceiver 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transceiver 13 may include an oscillator. The transceiver 13 may include $N_t$ (where $N_t$ is a positive integer) transmit antennas.

A signal processing process of the receiving device 20 is the reverse of the signal processing process of the transmitting device 10. Under control of the processor 21, the transceiver 23 of the receiving device 20 receives radio signals transmitted by the transmitting device 10. The transceiver 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The transceivers 13 and 23 include one or more antennas. An antenna performs a function for transmitting signals processed by the transceivers 13 and 23 to the exterior or receiving radio signals from the exterior to transfer the radio signals to the transceivers 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna may be obtained from a channel carrying another symbol of the same antenna. A transceiver supporting a MIMO function of transmitting and receiving data using a plurality of antennas may be connected to two or more antennas.

In the examples of the present disclosure, a terminal or UE operates as the transmitting device 10 in UL and as the receiving device 20 in DL. In the examples of the present disclosure, a BS or eNB operates as the receiving device 20 in UL and as the transmitting device 10 in DL.

The transmitting device and/or the receiving device may implement at least one or more of the foregoing examples of the present disclosure in combination.

As one of these examples, a UE for transmitting a UL signal in a wireless communication system may include a receiver and a transmitter; and a processor configured to control the receiver and the transmitter. The processor may determine whether transmission power of a plurality of UL channels of different transmission time interval (TTI) lengths, to be simultaneously transmitted on a plurality of serving cells, exceeds maximum power of the UE, and transmit a UL channel, excluding a UL channel determined according to a preset priority rule among the plural UL channels, when the transmission power of the plural UL channels exceeds the maximum power of the UE.

Additionally or alternatively, channels may be dropped starting from a UL channel of a low priority in order, among the plural UL channels, until the transmission power of the plural UL channels does not exceed the maximum power of the UE.

Additionally or alternatively, the preset priority rule may be defined in consideration of a TTI length, a channel type, whether UCI is included, and whether a demodulation reference signal (DMRS) is included.

Additionally or alternatively, the preset priority rule may be defined in further consideration of a cell index.

Additionally or alternatively, the preset priority rule may be defined in further consideration of a cell group or a PUCCH group.

Additionally or alternatively, UCI of the excluded UL channel determined according to the preset priority rule may be transmitted on a UL channel of a highest priority in a cell group or PUCCH group to which the excluded UL channel belongs.

Additionally or alternatively, the preset priority rule may be defined in consideration of a TTI length, a channel type, whether UCI is included, whether a demodulation reference signal (DMRS) is included, and a cell index.

As described above, the detailed description of the preferred examples of the present disclosure has been given to enable those skilled in the art to implement and practice the present disclosure. Although the present disclosure has been described with reference to exemplary examples, those skilled in the art will appreciate that various modifications and variations may be made in the present disclosure described in the appended claims. Accordingly, the present disclosure should not be limited to the specific examples described herein, but should be accorded the broadest scope consistent with the principles and novel features disclosed herein.

INDUSTRIAL APPLICABILITY

The present disclosure is applicable to wireless communication devices such as a terminal, a relay, a BS and the like.

The invention claimed is:

1. A method of transmitting an uplink channel in a wireless communication system, the method being performed by a user equipment (UE) and comprising:
    determining whether transmission power of a plurality of uplink channels of different transmission time interval (TTI) lengths, to be simultaneously transmitted on a plurality of serving cells, exceeds maximum power of the UE; and
    based on a determination that the transmission power of the plurality of uplink channels exceeds the maximum power of the UE, dropping some of the plurality of uplink channels, starting from an uplink channel of a low priority in order, according to a preset priority rule until transmission power of uplink channels to be transmitted by the UE does not exceeds the maximum power of the UE, and transmitting a remaining uplink channel,
    wherein the UE is configured with a primary physical uplink control channel (PUCCH) group and a secondary PUCCH group,
    wherein each of the primary PUCCH group and the secondary PUCCH group is comprised of one or more serving cells, and
    wherein uplink control information of an uplink channel dropped according to the preset priority rule is transmitted on an uplink channel of a highest priority in a PUCCH group to which the dropped uplink channel belongs.

2. The method of claim 1, wherein the preset priority rule is defined in consideration of a TTI length, a channel type, whether uplink control information is included, and whether a demodulation reference signal (DMRS) is included.

3. The method of claim 2, wherein the preset priority rule is defined in further consideration of a cell index.

4. The method of claim 3, wherein the preset priority rule is defined in further consideration of a physical uplink control channel (PUCCH) group, and wherein the preset priority rule is defined such that an uplink channel belonging to the primary PUCCH group has a higher priority than an uplink channel belonging to the secondary PUCCH group.

5. The method of claim 3, wherein the preset priority rule is defined such that an uplink channel of a short TTI length has a higher priority than an uplink channel of a long TTI length, an uplink channel with uplink control information has a higher priority than an uplink channel with no uplink control information, an uplink channel with a DMRS has a higher priority than an uplink channel with no DMRS, and an uplink channel with a low cell index has a higher priority than an uplink channel with a high cell index.

6. A user equipment (UE) configured to transmit 1 an uplink channel in a wireless communication system, the UE comprising:

a receiver and a transmitter;

a processor; and a computer-readable memory storing instructions that, based on being executed by the processor, perform operations comprising:

determining whether transmission power of a plurality of uplink channels of different transmission time interval (TTI) lengths, to be simultaneously transmitted on a plurality of serving cells, exceeds maximum power of the UE, and based on a determination that the transmission power of the plurality of uplink channels exceeds the maximum power of the UE, dropping some of the plurality of uplink channels, starting from an uplink channel of a low priority in order, according to a preset priority until transmission power of uplink channels to be transmitted by the UE does not exceeds the maximum power of the UE, and controlling the transmitter to transmit a remaining uplink channel, wherein the UE is configured with a primary physical uplink control channel (PUCCH) group and a secondary PUCCH group, wherein each of the primary PUCCH group and the secondary PUCCH group is comprised of one or more serving cells, and wherein uplink control information of an uplink channel dropped according to the preset priority rule is transmitted on an uplink channel of a highest priority in a PUCCH group to which the dropped uplink channel belongs.

7. The UE of claim 6, wherein the preset priority rule is defined in consideration of a TTI length, a channel type, whether uplink control information is included, and whether a demodulation reference signal (DMRS) is included.

8. The UE of claim 7, wherein the preset priority rule is defined in further consideration of a cell index.

9. The UE of claim 8, wherein the preset priority rule is defined in further consideration of a physical uplink control channel (PUCCH) group, and wherein the preset priority rule is defined such that an uplink channel belonging to the primary PUCCH group has a higher priority than an uplink channel belonging to the secondary PUCCH group.

10. The UE of claim 8, wherein the preset priority rule is defined such that an uplink channel of a short TTI length has a higher priority than an uplink channel of a long TTI length, an uplink channel with uplink control information has a higher priority than an uplink channel with no uplink control information, an uplink channel with a DMRS has a higher priority than an uplink channel with no DMRS, and an uplink channel with a low cell index has a higher priority than an uplink channel with a high cell index.

* * * * *